Patented Oct. 21, 1941

2,259,462

UNITED STATES PATENT OFFICE 2,259,462

PROCESS OF MANUFACTURE OF CELLULOSE ESTERS

Charles L. Fletcher, Kingsport, Tenn., assignor to Eastman Kodak Company, Rochester, N. Y., a corporation of New Jersey No Drawing. Application October 12, 1939, Serial No. 299,151

6 Claims. (Cl. 260—227)

This application relates to a method of preparing organic acid esters of cellulose of good stability and high melting point which comprises esterifying cellulose with an acylation bath containing 5–8% of sulfuric acid (based on the weight of the cellulose), as the catalyst, and subsequently neutralizing the sulfuric acid with sufficient of a neutralizing agent which gives a sulfate substantially insoluble in acetic acid so that only 1–4% of sulfuric acid, based on the weight of the cellulose, remains to catalyze the hydrolysis of the cellulose ester.

The preparation of cellulose esters has been proposed in which part of the sulfuric acid catalyst has been neutralized prior to hydrolysis. The neutralizing agents suggested have been such that the sulfate formed was soluble in the concentrated acetic acid present. In every such case it has been necessary to stabilize the resulting cellulose ester, thus showing that no stabilizing action was obtained.

The object of my invention is to prepare a cellulose ester having a high stability and high melting point and at the same time a better filtration characteristic and appearance than that of a cellulose ester prepared using a low percentage of catalyst. Other objects will appear herein.

I have found that in a hydrolysis process the melting point of the product is higher the lower the amount of catalyst present in the hydrolysis mixture and that the use of larger amounts of sulfuric acid in the acylation step results in a product having better appearance and filtration characteristics. By making cellulose acetate using 5–8% of sulfuric acid, based on the cellulose, in the esterification and 1–4% in the hydrolysis, in the absence of soluble sulfate salts a cellulose ester is obtained which is easily worked both as to filtration and because of appearance and yet is resistant to high temperatures.

There are many applications to which cellulose esters are put in which high melting and char points and good stability are important. For instance, cellulose esters are used for making textile fabrics wherein high resistance to scorching on ironing or pressing is desirable. My invention is adapted to the manufacture of cellulose esters from which fabrics which embody heat-resisting characteristics can be made.

In the making of cellulose acetate, or the like, I find it is desirable to use 5–8% of sulfuric acid in the acylation mixture due to the facility with which the reaction occurs and the good characteristics of the product. For example, a lower fatty acid ester of cellulose, consisting mainly of acetyl, which was made, using as catalyst 2000 cc. of conc. sulfuric acid per 500 pounds of cotton linters, was found to yield a product having 250 p. p. m. color, 150 p. p. m. haze (in 4–1 acetone) and a filtration value of 5–6 pounds of cellulose acetate per square foot of filtering area. A like ester but acetylated using as catalyst 8000 cc. of conc. sulfuric acid per 500 pounds of cotton linters had a color of 125 p. p. m., haze of only 70 p. p. m. (in 4–1 acetone) and a filtration rate of 12–14 pounds per square foot. However, when 8000 cc. of sulfuric acid instead of 2000 cc. (based on the cellulose) are used in hydrolyzing the cellulose ester, the melting point and stability of the product are too low. My invention aims to prepare cellulose esters in which the advantage of good appearance and good filtration characteristics, as characterize the higher catalyst product, may be obtained without impairing the melting point and stability of the product such as results from hydrolyzing the cellulose ester using, as the catalyst, approximately the same amount of sulfuric acid as used in the acylation.

I have found that, by esterifying the cellulose, using 5–8% sulfuric acid, (based on the weight of the cellulose) and subsequently neutralizing sufficient of the sulfuric acid so that only 1–4% of the sulfuric acid promotes the hydrolysis of the cellulose ester a high-grade product is obtained providing the neutralizing agent forms salts with sulfuric acid which are substantially insoluble in concentrated acetic acid and the neutralizing agent is soluble in weak acetic acid or water so that it can be readily added to the reaction mass. The presence of sulfates, which are soluble in the reaction mass, except, of course, the sulfuric acid, should be avoided in both the esterification and in the hydrolysis, particularly in the latter. By using a neutralizing agent, which forms insoluble sulfates, the equilibrium between the free sulfuric acid and the combined sulfuric acid is destroyed which is believed to be the cause of the removal of combined sulfuric acid from the cellulose ester formed. A product of good stability results so that any further stabilizing treatment is unnecessary.

Magnesium carbonate is particularly suited for use as a neutralizing agent because of the following characteristics which are regarded as definitely advantageous in my process:

1. It forms with sulfuric acid a salt which is only slightly soluble in concentrated acetic acid, is readily soluble in water and is, therefore, quickly and completely removed from the ester during the washing operation.

2. It is relatively cheap and available.

3. It dissolves readily in dilute acetic acid, that is, 90% acid or less, so that it may be easily added with the "final" or dilute aqueous acid added to promote the hydrolysis.

4. The salt, which it forms with the sulfuric acid, is readily soluble in water and is, therefore, quickly and completely removed from the ester during the washing operation.

Some other types of compounds, which may be used as neutralizing agents in my invention, are: magnesium acetate, aluminum acetate, barium hydroxide, magnesium carbonate, copper carbonate, calcium hydroxide and calcium acetate. Some of these compounds are not as suitable as magnesium carbonate because the sulfate salt, which they form, is not soluble in water and, therefore, with the formation of salts like barium sulfate, some other method of removing the salt from the ester during the washing operation is necessary. Materials, the presence of which are to be particularly avoided in both the esterification and the hydrolysis, are, the acetates, carbonates or hydroxides of sodium, potassium or ammonium or any other like materials, which form salts with sulfuric acid which are soluble to an appreciable extent in glacial acetic acid.

A process of preparing cellulose esters in accordance with my invention is carried out by first esterifying cellulose, such as cotton linters or refined sulfite pulp, with an esterification mixture containing 5–8% sulfuric acid (based on the cellulose), an acylating amount of a lower fatty acid anhydride, such as acetic anhydride and sufficient lower fatty acid such as acetic acid or inert solvent to maintain the mass sufficiently fluid for ease in working. The amount of sulphuric acid catalyst preferred is 8000 cc. using 500 pounds of cellulose. Although the amount of anhydride is not critical, (except that it should be sufficient to cause complete acylation of the cellulose) if acetic anhydride is used, the most suitable proportion is usually found within the range of 2½–3 parts of anhydride to one of cellulose. It is often desirable that a small amount of propionic or butyric acid be present in the esterification mixture to aid in the process, particularly if a high viscosity ester is being prepared as explained in Malm Patent No. 2,097,954, dated November 2, 1937. The method described in that patent is satisfactory for esterifying cellulose in accordance with my invention providing the proportion of sulfuric acid, set out above, is employed. After the esterification is completed, a final is added, consisting of aqueous acetic acid, of a concentration depending on the type of ester prepared. The strength of acetic acid, which is ordinarily suitable for use, is of 50–70 per cent strength. Incorporated in this final is one of the neutralizing agents specified above, such as magnesium carbonate, in an amount which will completely neutralize sufficient of the sulfuric acid to bring the sulfuric acid content of the hydrolyzing bath down to 1–4% (based on the cellulose). The hydrolysis is continued the desired time at any recognized hydrolyzing temperature, 100° F. having been found to be quite suitable. It is understood, however, that ordinarily increase of temperature will shorten the time of hydrolysis and vice versa, other things being equal, and that temperatures from 80° F. up to 120 or 130° F. might be employed in some cases. The time of hydrolysis necessary to obtain a cellulose acetate of 38–41% acetyl is that usually desired in making cellulose acetate.

I have observed that the melting point of a given ester is roughly proportional to the amount of catalyst present during the hydrolysis stage, assuming a constant amount of water is present. This relationship is indicated by the following data taken from a typical ester which had been hydrolyzed to the same precipitation value at approximately 100° F.:

| Sulfuric acid present during hydrolysis per 500 lbs. cotton | Melting point | Char point | Heat stability |
|---|---|---|---|
| Cc. | °F. | °F. | |
| 2000 | 255 | 305 | 6 |
| 4000 | 243 | 292 | 9 |
| 8000 | 237 | 279 | 12 |

The heat stability data is the result of a comparative test in which the figures given indicate the amount of breakdown of the ester, obtained in eight hours at 180° C. as compared to the breakdown of a stable ester heated a number of hours corresponding to the number given. It may be seen that the ester hydrolyzed with low sulfuric acid, when heated for eight hours, exhibited a discoloration comparable to that of an ester ordinarily considered to be of good stability which had been heated for six hours.

The following example illustrates my invention:

500 pounds of cotton linters was esterified to the triester with a mixture consisting of the following materials: 8000 cc. of sulfuric acid (sp. gr. 1.84) 3200 pounds of glacial acetic acid of which 10% was propionic acid and 1220 pounds of acetic anhydride. The esterification was conducted while cooling the batch so that the temperature at no time exceeded 110° F. When the dope was free of grain and the ester exhibited a first-stage viscosity of approximately 85 seconds, a mixture of 1380 pounds of aqueous acetic acid of 64% strength and 15 pounds of magnesium carbonate was stirred in. The mass was allowed to stand at 100° F. for approximately 85 hours thus hydrolyzing the ester. The resulting ester was precipitated in the usual manner, washed free of acid, centrifuged and dried at approximately 200° F. The product had a viscosity (1 part in 4 parts of acetone) of 250 seconds and exhibited a softening point of 248° C. and a char point of 300° C.

Color and haze values of cellulose esters are determined by comparing with a standard solution. These values are in parts per million (p. p. m.) being determined by the parts per million of the opaquing or coloring agent in the standard solutions with which the ester solutions compare. The filtration rate of a cellulose ester is determined by the number of pounds of the cellulose ester which filters through a filtering membrane until the pressure builds up to a point where there is danger of breaking the membrane. In every instance where a cellulose acetate was prepared in accordance with my invention the color and haze values and filtration characteristics were found to be superior to those of corresponding esters in which my invention was not employed.

The above examples are exemplary of processes which might be used to embody my invention. Any other acylation process might be employed embodying my invention providing sulfuric acid salts soluble in concentrated acetic acid are absent from the acylation and hydrolysis stages. My invention applies not only to the making of cellulose acetate but also to the making of lower fatty acid esters of cellulose generally such as cellulose acetate-propionate, cellulose acetate butyrate, cellulose propionate and cellulose butyrate, although it has been found particularly suitable for the preparation of cellulose esters in which acetyl predominates.

The esters prepared in accordance with my invention are especially adapted for uses which involve moderately hot conditions such as for instance for textiles which are subjected to ironing temperatures, to electrical insulation, plastics which are molded by means of heat and to cine film which is subjected to elevated temperatures in the motion picture projector. Due to their good stability these esters are suitable for use in any connection where permanence and insurance against cracking are important. It is to be understood that esters prepared by my invention are also suitable for ordinary uses even though heat resistance and permanence are not involved.

Where sulfuric acid is mentioned herein, concentrated sulfuric acid is meant. The concentration usually used is that having a specific gravity of 1.84. Where acetic acid is referred to, the concentrated acid is meant, unless otherwise specified. In the operations of acetylating cellulose and hydrolyzing the resulting ester, the water content of the reactants rarely exceeds 10% so that the acetic acid is concentrated in every instance.

What I claim is:

1. A method for preparing a hydrolyzed lower fatty acid ester of cellulose of good stability and high melting point which comprises acylating cellulose with an acylation bath containing sufficient lower fatty acid anhydride to substantially completely acylate the cellulose, a lower fatty acid and, as the catalyst, 5%–8% of sulfuric acid (based on the weight of the cellulose), and subsequently adding to the mass dilute aqueous lower fatty acid to impart a hydrolyzing condition thereto and only sufficient of a neutralizing agent which gives a sulfate substantially insoluble in concentrated acetic acid to reduce the sulfuric acid content of the mass to 1%–4% (based on the cellulose) and hydrolyzing the cellulose ester to the degree desired.

2. A method for preparing a hydrolyzed acetyl cellulose of good stability and high melting point which comprises acylating cellulose with an acylation bath containing sufficient acetic anhydride to substantially completely acylate the cellulose, a lower fatty acid and, as the catalyst, 5%–8% of sulfuric acid (based on the weight of the cellulose), and subsequently adding to the mass dilute aqueous lower fatty acid to impart a hydrolyzing condition thereto and only sufficient of a neutralizing agent which gives a sulfate substantially insoluble in concentrated acetic acid to reduce the sulfuric acid content of the mass to 1%–4% (based on the cellulose) and hydrolyzing the cellulose ester to the degree desired.

3. A method for preparing a hydrolyzed lower fatty acid ester of cellulose of good stability and high melting point which comprises acylating cellulose with an acylation bath containing sufficient lower fatty acid anhydride to substantially completely acylate the cellulose, a lower fatty acid and, as the catalyst, 5%–8% of sulfuric acid (based on the weight of the cellulose), and subsequently adding to the mass dilute aqueous lower fatty acid to impart a hydrolyzing condition thereto and only sufficient magnesium carbonate to reduce the sulfuric acid content of the mass to 1%–4% (based on the cellulose) and hydrolyzing the cellulose ester to the degree desired.

4. A method for preparing a hydrolyzed cellulose acetate of good stability and high melting point which comprises acylating cellulose with an acylation bath containing sufficient acetic acid anhydride to substantially completely acylate the cellulose, a lower fatty acid and, as the catalyst, 5%–8% of sulfuric acid (base on the weight of the cellulose), and subsequently adding to the mass dilute aqueous lower fatty acid to impart a hydrolyzing condition thereto and only sufficient magnesium carbonate to reduce the sulfuric acid content of the mass to 1%–4% (based on the cellulose) and hydrolyzing the cellulose ester to the degree desired.

5. A method for preparing a hydrolyzed lower fatty acid ester of cellulose of good stability and high melting point which comprises acylating cellulose with an acylation bath containing sufficient lower fatty acid anhydride to substantially completely acylate the cellulose, a lower fatty acid and, as the catalyst, 5%–8% of sulfuric acid (based on the weight of the cellulose), and subsequently adding to the mass dilute aqueous lower fatty acid to impart a hydrolyzing condition thereto and only sufficient calcium acetate to reduce the sulfuric acid content of the mass of 1%–4% (based on the cellulose) and hydrolyzing the cellulose ester to the degree desired.

6. A method for preparing a hydrolyzed lower fatty acid ester of cellulose of good stability and high melting point which comprises acylating cellulose with an acylation bath containing sufficient lower fatty acid anhydride to substantially completely acylate the cellulose, a lower fatty acid and, as the catalyst, 5%–8% of sulfuric acid (based on the weight of the cellulose), and subsequently adding to the mass dilute aqueous lower fatty acid to impart a hydrolyzing condition thereto and only sufficient of a neutralizing agent which gives a sulfate substantially insoluble in concentrated acetic acid to reduce the sulfuric acid content of the mass to 1%–4% (based on the cellulose) and hydrolyzing the cellulose ester at a temperature of approximately 100° F.

CHARLES L. FLETCHER.